United States Patent [19]

Flassayer

[11] Patent Number: 4,579,007

[45] Date of Patent: Apr. 1, 1986

[54] DYNAMOMETER COMPRISING AN ELASTIC BAR PROVIDED WITH STRAIN GAGES

[75] Inventor: Claude Flassayer, Nice, France

[73] Assignee: Sfernice Societe Francaise de l'Electro-Resistance, Paris, France

[21] Appl. No.: 666,311

[22] Filed: Oct. 30, 1984

[30] Foreign Application Priority Data

Nov. 4, 1983 [FR] France ................................ 83 17545

[51] Int. Cl.[4] ................................................ G01L 1/22
[52] U.S. Cl. ............................ 73/862.66; 73/862.08; 338/2
[58] Field of Search ........... 73/862.04, 862.05, 862.08, 73/862.35, 862.65, 862.66, 862.67, 775, 776, 777, 767; 338/2, 5

[56] References Cited

U.S. PATENT DOCUMENTS

| | | | |
|---|---|---|---|
| 2,392,293 | 1/1946 | Ruge | ................................ 338/2 X |
| 3,293,585 | 12/1966 | Horn . | |
| 3,826,130 | 7/1974 | Pusch . | |
| 4,145,921 | 3/1979 | Blackwelder . | |

FOREIGN PATENT DOCUMENTS

| | | | |
|---|---|---|---|
| 0824307 | 11/1959 | United Kingdom | .................... 338/2 |
| 1151435 | 5/1969 | United Kingdom | .................... 338/2 |

*Primary Examiner*—Charles A. Ruehl
*Attorney, Agent, or Firm*—Young & Thompson

[57] ABSTRACT

The dynamometer comprises a bar (1) made of elastic material, which is intended to be subjected to the stresses to be measured and the outer surface of which possesses strain gages. This bar (1) is substantially cylindrical and has on its outer surface a series of resistive strips (3a,4,4a,5,5a) arranged in at least one helix, these strips being of substantially equal lengths, and each strip extending over part of the periphery of the bar (1) and being separated from the following strip in the direction of advance of the helix, the ends of some of these strips being connected electrically by means of conductive lamellae (7,8,9). The invention is used to measure bending, torsional and shearing stresses.

8 Claims, 18 Drawing Figures

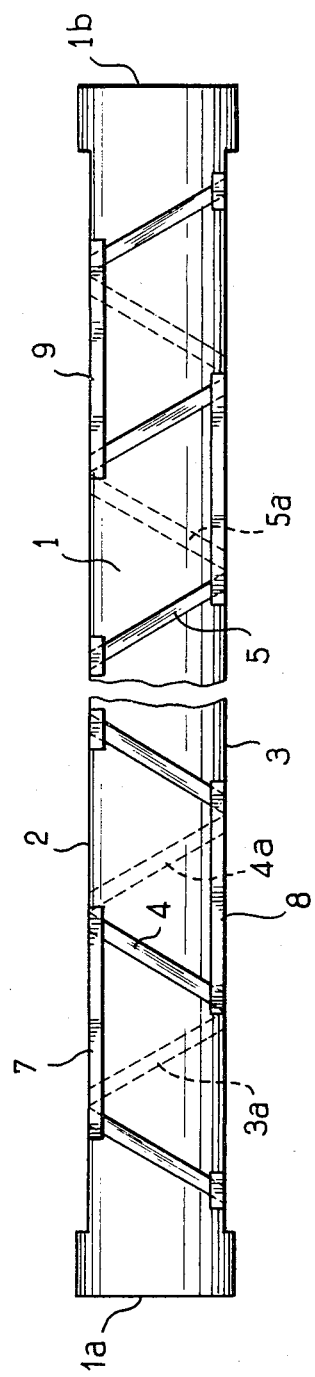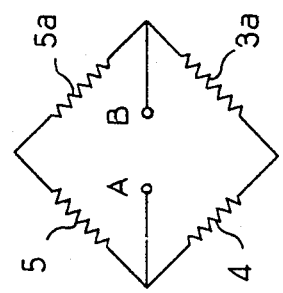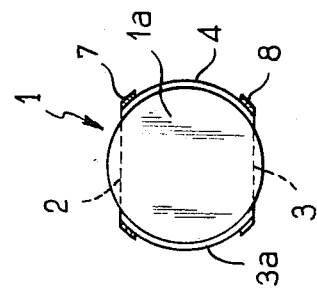

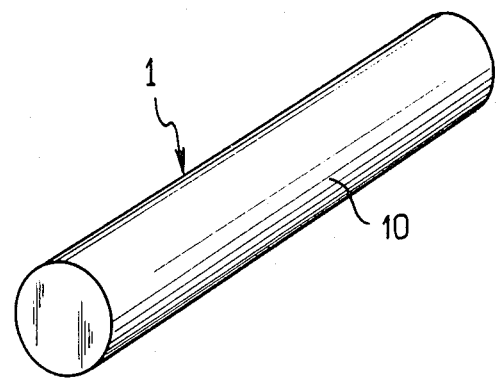
FIG_4
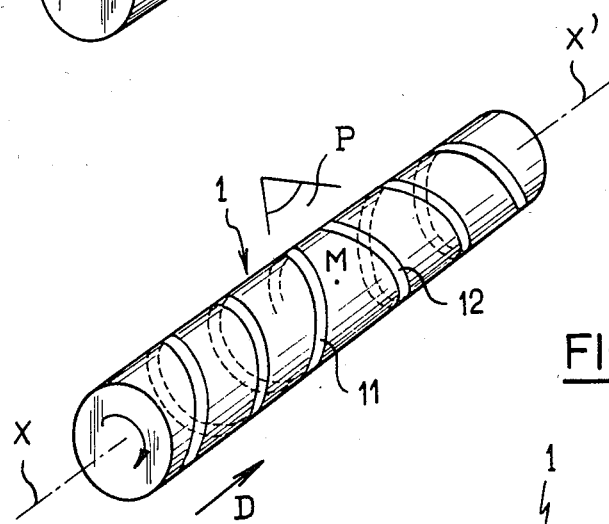
FIG_5
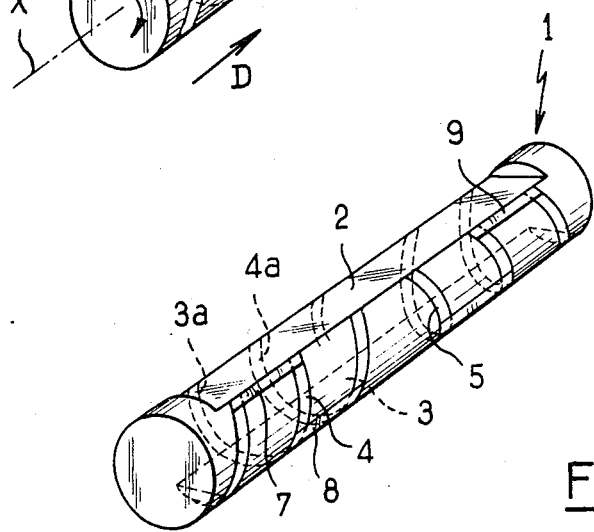
FIG_6

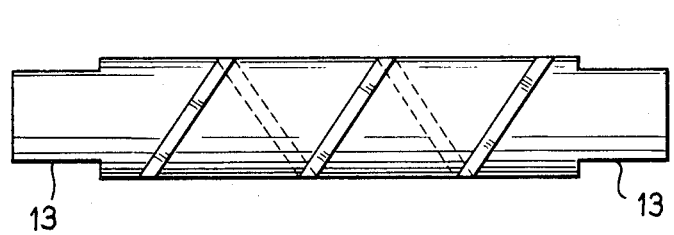
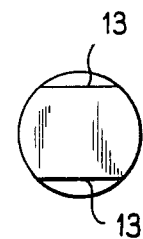
FIG.7  FIG.8
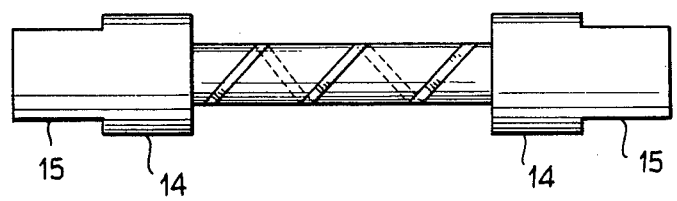
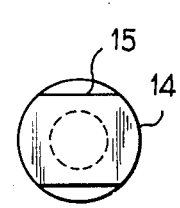
FIG.9  FIG.10
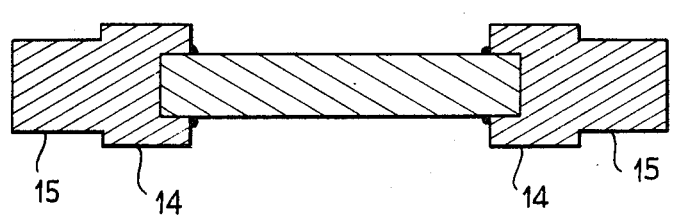
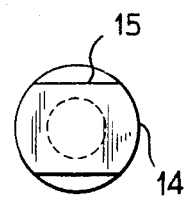
FIG.11  FIG.12

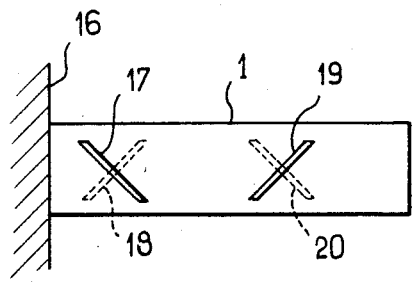
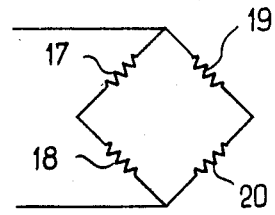
FIG_13  FIG_14
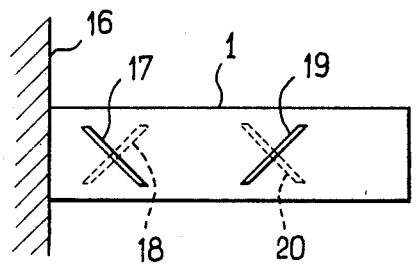
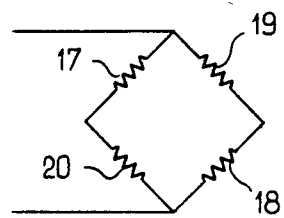
FIG_15  FIG_16
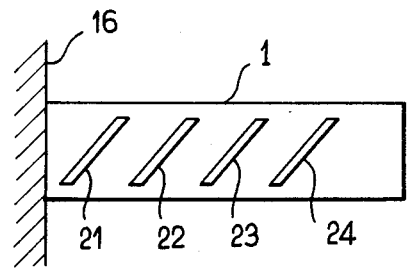
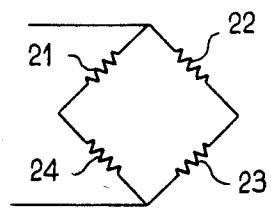
FIG_17  FIG_18

DYNAMOMETER COMPRISING AN ELASTIC BAR PROVIDED WITH STRAIN GAGES

The present invention relates to a dynamometer intended for measuring various mechanical stresses, such as shearing, torsional or bending stresses.

The invention is also aimed at the process for producing such a dynamometer.

In known embodiments, this type of dynamometer usually comprises a bar made of elastic material, the opposite ends of which are subjected to the shearing, torsional or bending stresses to be measured.

Strain gages consisting of resistive elements are applied, usually by means of bonding, to the outer surface of this bar constituting the test body of the dynamometer, and when the bar is subjected to a mechanical stress these are expanded or contracted, the effect of this being to modify their electrical resistance. These resistive elements are generally connected together to form a Wheatstone bridge which supplies at its terminals an electrical signal proportional to the stress exerted on the bar.

The arrangement of the resistive elements on the bar varies according to the type of stress to be measured.

The accuracy and consistency of the measurements made on these dynamometers depend mainly on the precision with which the strain gages have been applied to the test body.

The need for this precision makes the manufacture of these test bodies difficult and expensive and unsuitable for industrial production on a large scale.

The object of the present invention is to overcome this disadvantage by providing an inexpensively produced dynamometer possessing strain gages which are arranged on this bar in an accurate and reproducible way, this arrangement of the gages making it possible, simply by modifying the electrical connections between them, to measure stresses of various types.

The dynamometer with which the invention is concerned comprises a bar made of elastic material, which is intended to be subjected to the stresses to be measured and the outer surface of which possesses strain gages consisting of resistive elements, the resistance of which varies according to the stresses exerted on the bar.

According to the invention, this dynamometer is one wherein the bar is substantially cylindrical, is at least insulated electrically on its outer surface and has on the latter a series of resistive strips arranged around and along the bar in at least one helix, these strips being of substantially equal length, each strip extending over part of the periphery of the bar and being separated from the following strip in the direction of advance of the helix, and the ends of some of these strips being connected electrically by means of conductive lamellae.

This helical arrangement of the resistive strips on the cylindrical surface of the bar can be provided in a way which is both accurate and reproducable, so that the stresses to which the bar is subjected can be measured accurately and consistently.

Moreover, the fact that the bar is substantially cylindrical offers the advantage not only that it is easy to produce, but also that the torsional stresses are distributed uniformly over the entire surface of this bar.

On the other hand, simply by modifying the electrical connections between the various resistive strips, that is to say by modifying the conductive Lamellae connecting the ends of some of the resistive strips, the bar can easily be adapted for measuring stresses of various types, such as bending, shearing or torsional stresses.

According to an advantageous version of the invention, the bar possesses on its outer surface two flattened portions which are symmetrical relative to the axis of the bar and which separate the ends of the resistive strips.

These flattened portions constitute a means of separating the ends of the resistive strips which is simple to put into practice.

According to a preferred embodiment, the bar is made of ceramic, for example of the silicon nitride, silicon carbide or zirconia type.

This ceramic, whilst ensuring perfect insulation, has elasto-mechanical properties which are perfectly suited to the use with which the present invention is concerned.

The resistive strips are preferably produced from a layer of piezo-resistive alloy, such as an alloy of nickel and chromium or chromium and silicon.

According to another feature of the invention, the process for producing the dynamometer according to the invention involves the following stages:

A. A layer of electrically resistive material is applied to the bar made of elastic material, which is electrically insulating or insulated at the surface.

B. The layer is machined along a helical path extending around and along the bar, so as to leave in relief, on the surface of the bar, one or more continuous helical strips of electrically resistive material.

C. Two longitudinal and opposite zones of the bar are machined, so as to separate the continuous strip or strips into elements of resistive strips, D. The ends of some of the strip elements are connected by means of conductive lamellae obtained as a result of the deposition of a conductive metal.

This process makes it possible to obtain, at stage B, one or more helical resistive strips, the positions and reproducibility of which are extremely accurate.

The machining according to stage B is preferably carried out by means of a technique called "spiralling", which involves rotating the bar about its axis, moving it in the direction of its axis and sending a jet of sand or a fixed laser beam on to the surface of this bar.

All the stages of the process can be carried out automatically in a way which is perfectly suited to the large-scale production of dynamometers which are accurate, consistent and inexpensive at the same time.

Other particular features and advantages of the invention will also emerge from the following description.

In the attached drawings given by way of non-limiting examples:

FIG. 1 is a plan view of a dynamometer according to the invention,

FIG. 2 is an end view of this dynamometer,

FIG. 3 shows the connection of the resistive strips of the dynamometer so as to form a Wheatstone bridge, FIG. 4 is a perspective view of a cylindrical bar covered with a resistive layer, FIG. 5 is a perspective view of the bar, showing the resistive strips obtained as a result of the machining of the resistive layer, FIG. 6 is a perspective view of the bar, after the machining of the flattened portions and after the deposition of conductive lamellae connecting the resistive elements to one another, FIG. 7 is a plan view of an alternative embodiment of the dynamometer, FIG. 8 is an end view of this dynamometer, FIG. 9 is a plan view of another alternative form of the dynamometer, FIG. 10 is an end view of this other alternative form, FIG. 11 is a view in longitudinal section of a third alternative form of the dynamometer according to the invention, FIG. 12 is an end view of this dynamometer, FIG. 13 is a diagram of a dynamometer for measuring shearing stresses, FIG. 14 shows the electrical diagram for connecting the strain gages of this dynamometer, FIG. 15 is a diagram of a dynamometer for measuring torsional stresses, FIG. 16 shows the electrical diagram for connecting the strain gages of this dynamometer, FIG. 17 is a diagram of a dynamometer for measuring bending stresses, FIG. 18 shows the electrical diagram for connecting the strain gages of this dynamometer.

In the embodiment of FIGS. 1 and 2, the dynamometer comprises a bar 1, the opposite ends 1a and 1b of which are intended to be embedded in two members (not shown) moveable relative to one another, so as to subject the bar 1 to torsional, bending or shearing stresses which are to be measured.

This bar 1 is a cylinder on which two flattened portions 2,3 symmetrical relative to the axis of the bar have been made.

This bar 1 is made of a material having elastomechanical properties suitable for the stresses which it is to undergo.

This bar is preferably made of ceramic of the structural type, such as silicon nitride, silicon carbide or zirconia.

However, this bar 1 can also be made of an anodized aluminum alloy, enamelled steel or even plastic, the essential factor being that it is electrically insulated, at least at the surface.

Around and along the bar 1 there is a series of resistive strips, such as 3a,4,4a,5,5a, of constant thicknesses and of equal lengths and widths. The strips 3a,4 and 4a on the one hand, and the strips 5 and 5a, on the other hand, are arranged on two helices with opposite pitches and symmetrical relative to a plane perpendicular to the axis of the bar and passing through the center of the latter.

Each resistive strip, such as 3a,4,4a,5,5a, extends over part of the periphery of the bar 1 and is separated from the following strip, such as 4a, in the direction of advance of the helix. In the example illustrated, this separation is effected by means of the flattened portions 2,3 (see, in particular FIG. 2).

Thus, the various resistive strips are insulated electrically from one another by the flattened portions 2,3.

The ends of the resistive strips are connected to one another by means of conductive lamellae 7,8,9 which are arranged alternately along the longitudinal edges of the flattened portions 2,3.

In the example illustrated, the resistive strips 3a,4,4a,5,5a are connected to one another to form the Wheatstone bridge illustrated in FIG. 3, at the terminals A and B of which it is possible to measure the electrical signal generated when the bridge is unbalanced under the effect of a stress exerted on the bar 1.

The resistive strips 3a to 5a are made of a material having a high resistivity, good stability in terms of time and temperature and good piezo-resistive properties (a high gage coefficient).

Of the materials satisfying these conditions, the alloys of nickel and chromium and the alloys of chromium and silicon may be mentioned.

The conductive lamellae 7,8,9 are preferably made of a metal which is a good conductor of electricity, such as copper.

The process of producing the dynamometer according to the invention will now be described.

In a first stage (see FIG. 4), a layer 10 of resistive material, such as nickel/chromium or chromium/silicon, is applied to the bar 1 made of elastic material, which is electrically insulating or insulated at the surface.

This layer 10 can be deposited by means of vacuum metallization, pyrolysis or chemical and/or electrochemical deposition.

In a second stage (see FIG. 5), the layer 10 of resistive material is machined along a helical path extending around and along the bar 1, so as to leave in relief, on the surface of the bar, two continuous and helical strips 11 and 12 which are made of electrically resistive material and which are symmetrical relative to a plane P perpendicular to the axis X—X' and passing through the center M of the latter, and having opposing pitches.

This machining can be carried out according to the technique called "spiralling", which involves rotating the bar 1 about its axis X—X', moving the latter at the same time in the direction D of its axis and simultaneously sending on to the surface of this bar a jet of sand or a fixed laser beam, so as to eliminate the resistive layer 10 in the zone located on either side of the resistive strip 11 or 12.

This technique makes it possible to obtain resistive strips 11 and 12, the positions of which on the bar 1 are defined with a very high degree of accuracy.

In a third stage (see FIG. 6), two flattened portions 2,3 which are parallel and symmetrical relative to the axis of the bar 1 are machined, so as to separate the continuous strips 11 and 12 into elements of resistive strips 3a,4,4a,5, as indicated in FIG. 1. These strip elements 3a,4,4a,5 are thus insulated electrically from one another.

In a fourth stage (see FIG. 6), some of the strip elements are connected by means of conductive lamellae 7,8,9 which extend along the longitudinal edges of the flattened portions 2,3. These conductive lamellae 7,8,9 can be obtained as a result of the vacuum deposition of an electrically conductive metal, such as copper.

The method of producing the flattened portions 2,3 is optional. In fact, to separate the continuous strips 11 and 12 into elements of resistive strips insulated from one another, it will be sufficient to engrave in the resistive layer 10 two strips which are symmetrical relative to the axis of the bar. The bars illustrated in FIGS. 7 to 12, which do not have any flattened portions, are assumed to possess such symmetrical strips.

The bars illustrated in FIGS. 7 to 10 are in one piece, as in the embodiment according to FIGS. 1 and 2, but have resistive strips arranged in a single helix.

The opposite ends of the bar illustrated in FIGS. 7 and 8 have flattened portions 13 which are symmetrical relative to the axis of the bar and which make it possible to embed this bar in the members between which mechanical stresses are to be measured.

The bar shown in FIGS. 9 and 10 has, at its opposite ends cylindrical end pieces 14 of a larger cross-section than that of the bar and having flattened portions 15 serving for embedding the bar.

The general form of the bar illustrated in FIGS. 11 and 12 is identical to that of the bar according to FIGS. 9 and 10, but it is in two parts. The cylindrical central part is fitted into two end pieces 14 and connected to these, for example by means of welding.

As emerges from the preceding description, the process according to the invention makes it possible to produce, on two opposing lateral faces of the bar, resistive strips which are of equal lengths and the positions of which are defined with extreme accuracy.

According to this process, the various types of dynamometer illustrated diagrammatically by way of example in FIGS. 13,15 and 17 can be produced.

FIG. 13 illustrates a dynamometer, the bar 1 of which, embedded in a fixed part 16, undergoes a shearing stress. It has, on two opposite faces of the cylindrical bar, two symmetrical series of strips, each comprising two resistive strips 17,18, on the other hand, and 19,20, on the other hand, which are arranged respectively on two opposite faces of the bar in opposite directions. These resistive strips 17,18 and 19,20 are connected electrically to one another by means of conductive strips (not shown), so as to form a Wheatstone bridge (see FIG. 14) which generates an electrical signal proportional to the shearing stresses exerted on the bar 1. As regards FIG. 15, the arrangement of the resistive strips 17,18 and 19,20 is identical to that of FIG. 13. However, their electrical connection is such that the strips 18 and 20 are arranged on different branches of the Wheatstone bridge (see FIG. 16). Consequently, the Wheatstone bridge generates an electrical signal proportional to the torsional stresses exerted on the bar 1.

In the case of FIG. 17, the resistive strips 21, 22,23,24, are arranged on a single face of the bar 1. They are parallel to one another and form an angle with the direction of elongation of the bar. These strips are connected electrically to one another in the order 21,22,23,24, so as to form the Wheatstone bridge illustrated in FIG. 18, which is designed for measuring bending stresses.

The invention is of course not limited to the examples which have just been described, and numerous modifications can be made to these, without departing from the scope of the invention.

Thus, the materials constituting the resistive strips can differ from those described, provided that their resistivity is sufficiently stable in terms of time and temperature.

Likewise, the material constituting the bar 1 can vary according to the magnitude of the stresses which it must undergo.

Moreover, the process of engraving the resistive strips can differ from those described provided that this process makes it possible to obtain strips arranged accurately in one or more helices.

I claim:

1. A dynamometer comprising bar (1) made of elastic material, which is intended to be subjected to the stresses to be measured and the outer surface of which possesses strain gages consisting of resistive elements (3a,4,4a,5,5a), the resistance of which varies according to the stresses exerted on the bar, wherein this bar (1) is substantially cylindrical, is at least insulated electrically on its outer surface and has on the latter a series of resistive strips (3a,4,4a,5,5a) arranged around and along the bar in at least one helix, these strips being of substantially equal length, each strip extending over part of the periphery of the bar (1) and being separated from the following strip in the direction of advance of the helix, and the ends of some of these strips being connected electrically by means of conductive lamellae (7,8,9).

2. A dynamometer as claimed in claim 1 wherein the bar (1) possesses on its outer surface two flattened portions (2,3) which are symmetrical relative to the axis of the bar and which separate the ends of the resistive strips (3a,4,4a,5,5a).

3. A dynamometer as claimed in claim 2, wherein the conductive lamellae (7,8,9) connecting some of the resistive strips (3a,4,4a,5,5a) extend along the longitudinal edges of the flattened portions (2,3).

4. A dynamometer as claimed in claim 3, wherein the conductive lamellae (7,8,9) connect some of the resistive strips (3a,4,4a,5,5a), so as to connect the latter to form one or more Wheatstone bridges.

5. A dynamometer as claimed in claim 1, which possesses two series of resistive strips (3a,4, 4a,5,5a; . . . ) arranged in two helices of opposite pitches and symmetrical relative to a plane perpendicular to the axis of the bar (1) and passing through the center of the latter.

6. A dynamometer as claimed in claim 1, wherein the bar (1) is made of ceramic.

7. A dynamometer as claimed in claim 1, wherein the resistive strips (3a,4,4a,5,5a) are made from a layer of piezo-resistive alloy, such as nickel chromium or chromium/silicon.

8. A dynamometer as claimed in claim 1, wherein the conductive lamellae (7,8,9) are made from a deposit of copper.

* * * * *